(No Model.)
J. T. BAGGS.
BELT GEARING.
No. 310,359. Patented Jan. 6, 1885.
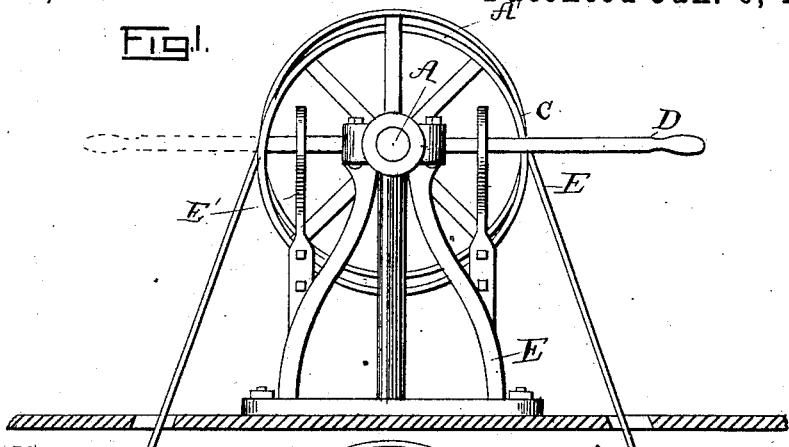
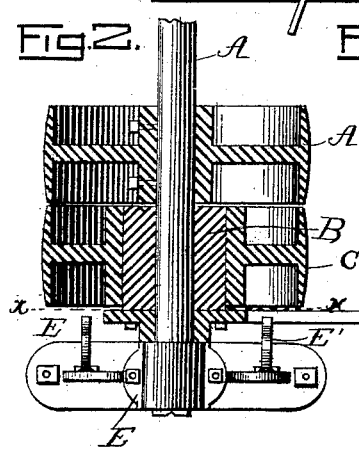
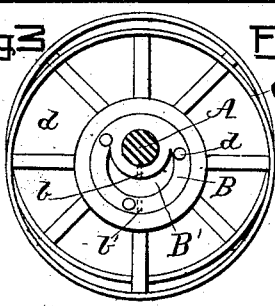
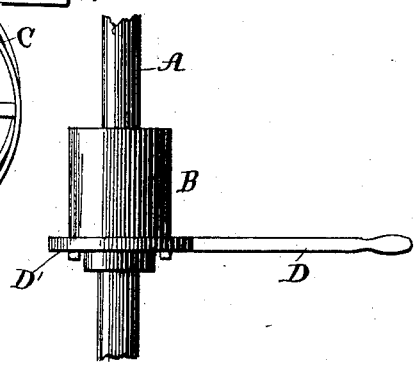
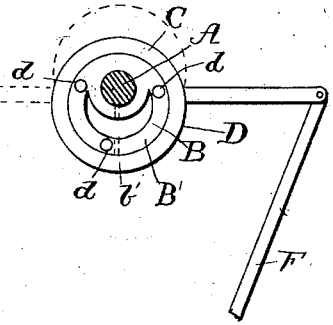
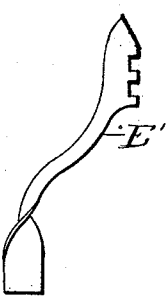
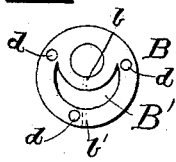
WITNESSES:
Norris A. Clark.
P. B. Turpin
INVENTOR.
James T. Baggs
By R.S. & A.P. Lacey
ATTY.

UNITED STATES PATENT OFFICE.

JAMES T. BAGGS, OF BRIDGEPORT, OHIO.

BELT-GEARING.

SPECIFICATION forming part of Letters Patent No. 310,359, dated January 6, 1885

Application filed October 29, 1884. (No model.)

*To all whom it may concern:*

Be it known that I, JAMES T. BAGGS, a citizen of the United States, residing at Bridgeport, in the county of Belmont and State of Ohio, have invented certain new and useful Improvements in Belt-Gearing; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

My invention relates to belt-gearing, and has for its object to provide simple means by which the belt may be conveniently loosened when it is shifted onto the loose pulley.

The invention consists, broadly, in journaling the loose pulley on an adjustable center, as will be hereinafter more fully described and claimed.

In the drawings, Figure 1 is a side view of my improvement; Fig. 2, a plan view, partially in section. Fig. 3 is a sectional view on line $x\ x$, Fig. 2. Fig. 4 is a detached view of the center on the shaft. Fig. 5 is a detail end view of the center. Fig. 6 is a detail of the rack. Fig. 7 represents a modification of the operating mechanism.

In the use of drive-belts experience has demonstrated that they become inferior and have less capacity of pulling from being constantly stretched, both while on the loose and the keyed pulley, and belts, as a rule, are adjusted onto the loose pulley a great part of the time—nights, Sundays, &c. Therefore, ordinarily, they are stretched a large part of the time and soon become worthless. To obviate this it is the custom in some shops to throw the belts off the pulleys when work is over. This, however, is inconvenient, and necessitates the replacement of the belts on the pulleys when work is resumed, involving a considerable amount of time, as will be understood; also, when the belt is tight on the loose pulley and the line or other shaft is revolving, the friction of the shaft in the pulley produces damaging wear of the parts, as will manifestly appear.

I have shown in the drawings a shaft, A, on which is keyed or otherwise secured the tight pulley A'. The center B is of cylindrical shape, and is journaled eccentrically on the shaft A, alongside the pulley A'. I prefer to provide this center with a cavity or mortise, B', extended longitudinally from one end, and communicating by perforations $b\ b'$ with the bearing on shaft A, and with the outer side of the center. In use I design to supply this cavity with a proper lubricant, which will pass through openings $b\ b'$ and oil the shaft A and the loose pulley, as will be understood from Figs. 3, 5, and 6. The loose pulley C is journaled on the eccentric, the latter forming a center for same. When the center is turned with its farthest point from its center of motion up, it throws the upper periphery of the loose pulley up flush with that of the tight pulley, in convenient position for the shifting of the belt from one to the other pulley, and when the described position of the eccentric-center is reversed the loose pulley having the belt thereon is lowered, as will be seen, relieving the belt of its tension, and also relieving the frictional wear of the shaft within the center.

It is not material to the main end of my invention by what means the eccentric is adjusted or how it is held in its several positions, as such results may be secured in various ways, as will be manifest. I prefer, however, in practice to employ the handle D, which may be formed integral with or be secured in suitable manner to the eccentric. When the eccentric is formed with a cavity, as B', I prefer to provide the handle with a ring, D', fitted against the end of the eccentric and closing said cavity, and secure it in such position by screw-studs $d$, projected from the eccentric through the ring D' and secured by nuts $d'$, as will be understood from Figs. 2 and 4. The handle may be held in either of its positions by spring-racks E' E', supported on the bearing-frame E. The racks E' or handle D may be made of spring metal or otherwise, so as to permit their adjustment into and out of engagement. I employ this arrangement in cases where the line-shaft is arranged near or under the floor. In cases where the line-shaft is arranged near the ceiling I pivot to the handle a depending arm, F, arranged to engage a rack, as will be seen in Fig. 6.

It will be appreciated that my invention is alike applicable to cases where the loose pulley is arranged on the drive or line shaft, and where it is arranged on the operating-shaft of the machine sought to be driven. When the loose pulley is brought concentric with running pulleys by and with the movement of the sleeve, the loose or dead pulley may have motion imparted to it by being moved toward and brought in contact with the running pulleys by a slight incline formed on the outer end of sleeve wedging against a fixed impediment or hanger—as, for example, the thread or incline of a screw coming in contact with a fixed nut—or by any other equivalent method of producing friction between the pulleys, thereby imparting motion to the dead or loose pulley. The advantage would be to prevent the stretching and bruising of the edges of the belts in starting heavy machines.

Having thus described my invention, what I claim, and desire to secure by Letters Patent, is—

1. The combination of the shaft, the center journaled eccentrically thereon, and the pulley journaled on the said eccentric-center, substantially as and for the purposes specified.

2. The combination of the shaft, the center journaled eccentrically thereon and provided with a cavity, B', having outlet-ports $b\ b'$, and the pulley journaled on the center, substantially as set forth.

3. The combination of the bearing-frame provided with racks E', the shaft, the eccentric-center, the pulley journaled thereon, and the handle secured to the eccentric, substantially as set forth.

In testimony whereof I affix my signature in presence of two witnesses.

JAMES T. BAGGS.

Witnesses:
GEO. B. PASCO.
OSCAR MABERY.